United States Patent [19]
Nakagawa

[11] Patent Number: 5,129,738
[45] Date of Patent: Jul. 14, 1992

[54] BEARING DEVICE

[75] Inventor: Hisaya Nakagawa, Komagane, Japan

[73] Assignee: Sankyo Seiki Mfg. Co., Ltd., Nagano, Japan

[21] Appl. No.: 645,136

[22] Filed: Jan. 24, 1991

[30] Foreign Application Priority Data

Jan. 24, 1990 [JP] Japan .................. 2-5496[U]

[51] Int. Cl.$^5$ ............................................. F16C 33/06
[52] U.S. Cl. ..................... 384/279; 384/322; 384/902
[58] Field of Search .............. 384/279, 100, 114, 118, 384/902, 322

[56]  References Cited
U.S. PATENT DOCUMENTS

| 2,153,397 | 4/1939 | Sandler | 384/279 |
| 2,855,249 | 10/1958 | Gérard | 384/279 |
| 3,046,068 | 7/1962 | Sternlicht | 384/279 |
| 4,290,655 | 9/1981 | Apuzzo et al. | 384/902 X |

FOREIGN PATENT DOCUMENTS

| 2628918 | 1/1978 | Fed. Rep. of Germany | 384/118 |
| 230905 | 11/1985 | Japan | 384/279 |
| 167922 | 7/1987 | Japan | 384/322 |

Primary Examiner—Thomas R. Hannon
Attorney, Agent, or Firm—McAulay Fisher Nissen Goldberg & Kiel

[57] ABSTRACT

Bearing devices which rotatably support a shaft in a bearing having a plurality of radial projections formed on either the inside peripheral surface of the bearing or the peripheral surface of the shaft are discolsed. The bearing has an oil film formed between the projections and the mating part opposite to the projections for supporting the shaft. The projections are adapted to face the mating part with a specified area sufficient to cause a specified oil film dynamic pressure effect to occur. In one form of the invention, the projections are formed of an oil impregnated sintered metal, the part of the surface of the projections facing the mating part having been subject to a filling-up process.

5 Claims, 2 Drawing Sheets

BEARING DEVICE

BACKGROUND OF THE INVENTION

1. Field of the Invention

The present invention relates to a bearing device for supporting a shaft by providing a plurality of projections on either the bearing or the shaft.

2. Background Prior Art

Generally, a bearing device rotatably supports a shaft in a bearing. Recently, bearing devices having a plurality of radial projections formed on either the inside peripheral surface of the bearing or the peripheral surface of the shaft have been proposed. The devices proposed have, for example, a structure as shown in FIG. 4. The bearing device illustrated in FIG. 4, which employs a so-called three-point supporting bearing, has 3 radial projections 1b formed on the inside peripheral surface of a bearing 1 formed of an oil impregnated sintered metal. Between each projection 1b and a mating shaft 2 facing to the projections 1b, a wedge-shaped oil film 3 is produced, respectively, to create so-called self-lubrication.

However, since the projections 1b in the conventional bearing device have the portions facing to the mating part formed to a linear shape, the dynamic pressure effect of the oil film 3 is very small. Accordingly, when a large load is applied to the shaft 2 in an eccentric direction, the projections 1b of bearing 1 may make metal-to-metal contact with the shaft 2, which causes wear of projections 1b. As the wear progresses, the projections gradually become small, and a normal oil film cannot be formed.

A primary object of the present invention is to provide a bearing device which increases the resistance to wear of the projections for supporting the shaft.

SUMMARY OF THE PRESENT INVENTION

To achieve the above-mentioned object, in a bearing device to rotatably support a shaft in a bearing having a plurality of radial projections formed on either the inside peripheral surface of the bearing or the peripheral surface of the shaft and having an oil film formed between the projections and the mating part opposite to the projections for supporting the shaft. The projections are adapted to be substantially equidistant from and face the mating part with an area sufficient to cause a specified oil film dynamic pressure effect to occur.

In another aspect of the present invention, in a bearing device to rotatably support a shaft in a bearing having a plurality of radial projections formed on either the inside peripheral surface of the bearing or the peripheral surface of the shaft and having an oil film formed between the projections and the mating part opposite to the projections for supporting the shaft, the bearing or shaft, on which said projections are formed, is formed of an oil impregnated sintered metal, the projections are substantially equidistant from and face the mating part with an area sufficient to cause a specified oil film dynamic pressure effect to occur, and, at least, the part of the surface of said projections facing the mating part has been subjected to filling-up.

In the first above described form of the invention, the projections are formed so as to have a specified large area in order to reduce the escaping quantity of oil pressure, and, thereby, a large oil film dynamic pressure effect is generated. Accordingly, even when a large load is applied to the shaft in an eccentric direction, a good oil film is always formed between each projection and the mating part opposite to the projection. As a result, the shaft is stably supported by the bearing without occurrence of metal-to-metal contact with the bearing.

For a better understanding of the present invention, reference is made to the following description and accompanying drawings while the scope of the invention will be pointed out in the appended claims.

DETAILED DESCRIPTION OF THE INVENTION

Figure 1:
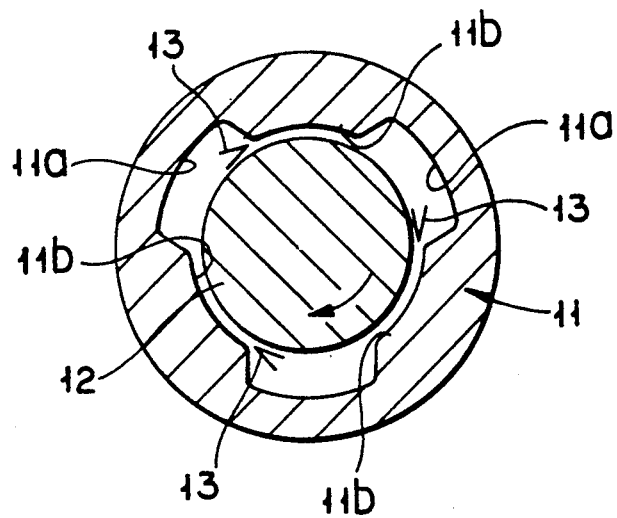
FIG. 1 is a cross-sectional view of one embodiment of the present invention.
Figure 2:
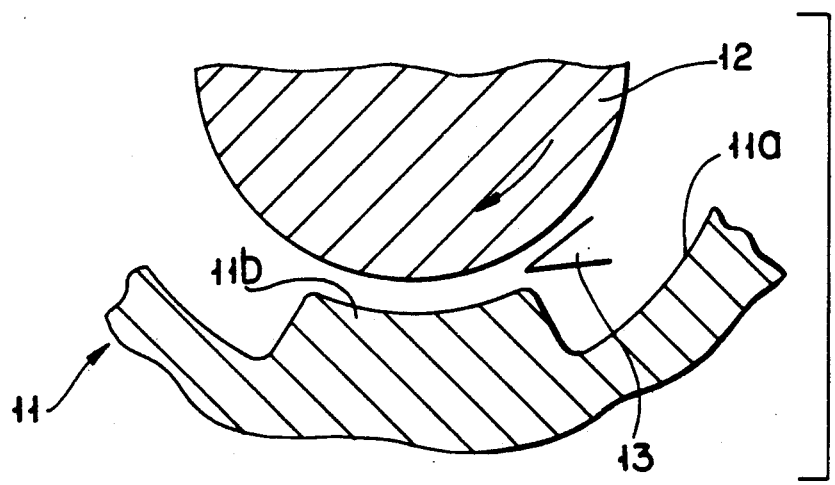
FIG. 2 is an enlargement of a portion of FIG. 1.

FIG. 1 illustrates an embodiment in which the present invention is applied to a so-called three-point supporting bearing. As shown in FIG. 1, a shaft (12) is loosely inserted into a hollow cylindrical bearing 11 formed of an oil impregnated sintered metal. On the inside peripheral surface 11a of the bearing 11, 3 projections 11b extend inwardly in the radial direction, that is, toward the shaft 12. A wedge-shape oil film 13 is formed between each projection 11b and the mating shaft 12 opposite to the projection 11b to make so-called self-lubrication.

At this time, the part of each projection 11b facing the shaft 12 is formed to be a curved surface along the peripheral surface of the shaft 12 and equidistant therefrom, and the part has an area sufficient to make the dynamic pressure effect of the oil film 13 greater than specified. The area of the part of projection 11b facing the shaft 12 is set in proportion to the magnitude of the eccentric load to be applied to the shaft 12.

Furthermore, the part of the surface of the projection facing the shaft 12 has been subjected to filling-up so that no pores exist. This filling-up can be easily formed by pressing a bar member corresponding to a core against the surface portion of projection 11b in the manufacturing process of bearing 11. In this case, pores exist as they are on the inside peripheral portions 11a of the bearing 11 other than the projections 11b, which enables lubrication to be performed.

In such an embodiment as mentioned above, by providing the projections 11b with an area facing the shaft 12 larger than a specified value, a large oil dynamic pressure effect corresponding to the large facing area is generated. That is, the large area of each projection 11b facing the shaft 12 reduces the escaping quantity of oil pressure generated between them resulting in an increase in the dynamic pressure. Further, this large dynamic pressure is stably maintained by the part of the surface of projection 11b subjected to the filling-up.

For this reason, even when a large load is applied to the shaft 12 in an eccentric direction, a good oil film 13 is formed between each projection 11b and the mating shaft 12 opposite to it, and the shaft is stably supported by the self-lubrication caused by the oil film without metal-to-metal contact with the bearing 11. Further, if metal-to-metal contact should occur between them, the load (surface pressure) per unit area at contact is small because of the large area of each projection 11b facing the shaft 12. Therefore, the wear of bearing 11 will be substantially reduced.

Figure 3:
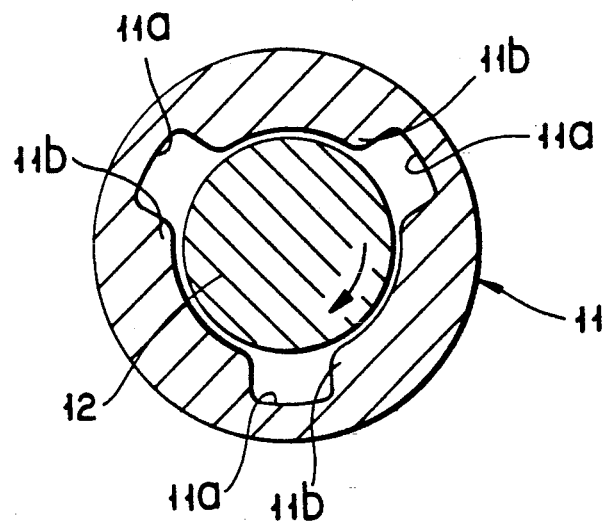
FIG. 3 is a cross-sectional view of the second embodiment of the present invention.
Figure 4:
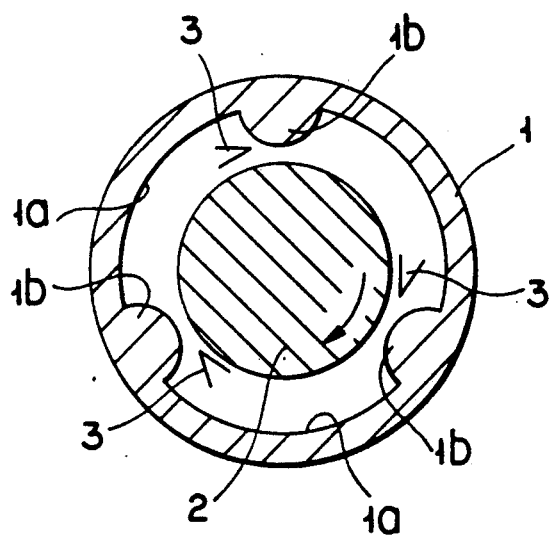
FIG. 4 is a proposal of a prior arrangement shown in cross-section.

FIG. 3 illustrates an embodiment where a larger eccentric load is applied. In this embodiment, the area of each projection 11b facing the shaft 12 is larger than that in the embodiment mentioned above. Thereby, the dynamic pressure effect of oil generated at each projection 11b can be made greater, and a stronger oil film can be formed to withstand a large eccentric load applied to the shaft 12.

However, if the area of each projection 11b facing the shaft 12 becomes too large, the area of the part to which oil is supplied, or the porous part, becomes too small and therefore, causes insufficient oil supply. This results in damage to self-lubrication. That is, the increase in the area of each projection 11b facing the shaft 12 has a given limitation.

With an oil impregnated metal powder sintered bearing of about 4 mm bearing bore diameter to be used in a spindle motor having a height of 5.9 mm for driving 3.5-inch disc, for bearings having a rotating speed of about 300 to 360 rpm and an eccentric load of about 0.11 newtons, the projection 11b is about 0.02 mm high and about 30° to 50° wide.

Further, with an oil impregnated metal powder sintered bearing of about 5 mm bearing bore diameter to be used in the spindle motor having a height of 5 mm for laser discs, for bearings having a rotating speed of about 1800 rpm and an eccentric load of about 1.5 newtons, the projection 11b is about 0.01 mm high and about 50° to 70° wide.

In the above embodiments, the projections are provided on the bearing side, but it is possible to provide them on the shaft side. In this case, also, a similar action and effect can be obtained.

In the invention described above with respect to the first embodiment, since the projections formed on either the bearing or the shaft for supporting the shaft are adapted to face to the mating part with a specified area in order to generate an oil dynamic pressure effect over a specified level, metal-to-metal contact with the shaft can be avoided even when an eccentric load is applied. As a result, the resistance to wear of the projections can be increased, and good shaft supporting conditions can be maintained.

In the invention described above with respect to the second embodiment, since the projections formed on either the bearing or the shaft for supporting the shaft are adapted to face the mating part with a specified area and, at the same time, at least the part of the surface of the projections has been subjected to filling-up, metal-to-metal contact with the shaft can be avoided even when a larger eccentric load is applied. As a result, the resistance to wear of the projections can be further increased, and a good shaft supporting condition can be more stably obtained.

What is claimed is:

1. In a bearing device to rotatably support a shaft in a hollow cylindrical bearing being formed of an oil impregnated sintered metal, the improvement comprising that a plurality of filling-up processed areas are formed on an inner surface of said hollow cylindrical bearing with a sufficient surface area having at least a 30° angle along the peripheral direction to cause a specified oil film dynamic pressure effect to occur, said specified oil film dynamic pressure effect for avoiding physical contact between the shaft and bearing when an eccentric load is applied to the shaft.

2. In a bearing device to rotatably support a shaft in a bearing having a plurality of radial projections formed on either the inside peripheral surface of said bearing or the peripheral surface of said shaft and having an oil film formed between the projections and the mating part opposite to the projections for supporting the shaft, the improvement comprising that the projections are formed to be substantially equidistant from and facing the mating part with a sufficient surface area so as to cause a specified oil film dynamic pressure effect to occur for avoiding physical contact between the shaft and bearing when an eccentric load is applied to the shaft, and wherein three projections are provided and each projection is between 30° to 50° wide.

3. In a bearing device to rotatably support a shaft in a bearing having a plurality of radial projections formed on either the inside peripheral surface of said bearing or the peripheral surface of said shaft and having an oil film formed between the projections and the mating part opposite to the projections for supporting the shaft, said bearing or shaft, on which said projections are provided, being formed of an oil impregnated sintered metal, the improvement comprising that said projections are formed to be substantially equidistant from and facing the mating part with a sufficient surface area to cause a specified oil film dynamic pressure effect to occur, and, at least, the part of the surface of said projections facing the mating part having been subjected to a filling-up process, said specified oil film dynamic pressure effect for avoiding physical contact between the shaft and bearing when an electric load is applied to the shaft and wherein three projections are provided and each projection is between 50° to 70° wide.

4. The bearing device of claim 2 or claim 3 wherein the surface area of the part facing the projections is preselected in proportion to the magnitude of the eccentric load applied to the shaft.

5. The bearing device of claim 2 or claim 3 wherein the opposing surface areas of the projections and mating part are curved.

* * * * *